United States Patent [19]
Skrydstrup

[11] Patent Number: 4,864,388
[45] Date of Patent: Sep. 5, 1989

[54] CHROMA KEYER COLOR DISCRIMINATOR

[76] Inventor: Ole Skrydstrup, 39 W. River Drive, Manotick, Ontario, Canada, K0A 2N0

[21] Appl. No.: 479,467

[22] Filed: Mar. 28, 1983

[51] Int. Cl.⁴ ............................................. H04N 9/75
[52] U.S. Cl. ................................................. 358/22
[58] Field of Search ............... 358/22; 356/405, 406, 356/407

[56] References Cited
U.S. PATENT DOCUMENTS
3,959,813  5/1976  Legler ...................... 358/22
4,183,045  1/1980  Herrmann et al. ........... 358/22

Primary Examiner—James J. Groody
Attorney, Agent, or Firm—Gerald J. Ferguson, Jr.

[57] ABSTRACT

A chroma keyer color discriminator wherein orthogonal color difference signals $B-Y$ and $R-Y$ are rotated through an angle $\phi$ corresponding to a desired chroma keying signal where R and B are red and blue signals and Y is the luminance signal where $Y=0.3R+0.59G+0.11B$. The rotated signals $(R-Y)'$ and $(B-Y)'$ are processed to develop $B'-G'$ and $B'-R'$ signals to enhance the selectivity of the discriminator. Difference signals other than $B-Y$, $R-Y$, $B'-G'$, and $B'-R'$ may also be employed.

38 Claims, 4 Drawing Sheets

CHROMA KEYER COLOR DISCRIMINATOR

BACKGROUND OF THE INVENTION

This invention relates to an improved chroma keyer and to an improved color discriminator for use therewith which can be continuously adjusted to select a color of interest from a video source, the selected signal being a chroma key signal which actuates the chroma keyer.

As described in U.S. Pat. No. 3,560,638 granted to Ole Skrydstrup and John D. Ross, which patent is hereby incorporated herein by reference, it is known to matrix red, green and blue camera signals (R, G, and B) together to form R-Y and B-Y signals where Y is the luminance signal given by Y=0.30R+0.59G+0.11B. A chroma key signal (CK) is then formed by generating:

$$CK = (R\text{-}Y) \cos \phi + (B\text{-}Y) \sin \phi$$

where $\phi$ is the hue angle of the selected color. Sin $\phi$ and cos $\phi$ may be derived in a known manner from either a special potentiometer with these outputs or from an electronic sin/cos generating circuit driven by a normal linear potentiometer.

Signal CK will have a maximum where the camera scans the selected color. However, the selectivity is not very good. If, for example, the selected color is set to blue, the neighboring colors, cyan and magenta, are only attenuated 6 db thus restricting the subject colors. Techniques using stretching and clipping have been employed to improve the selectivity but this inevitably results in a worsening of the signal to noise ratio.

It is known to obtain improved selectivity by generating B-G and B-R and then forming the chroma key signal by selecting in a non-additive mixer the smaller of the two signals:

CK = smaller of (B-G), (B-R)

However, the chroma key color must be pure blue as no provision is made to adjust for hue. This is not very easy to obtain and very often places undue restrictions on studio set-ups. It is possible, by swapping inputs, to also use pure green and red colors. The advantage of this method is that neighboring colors such as magenta and cyan are completely suppressed as seen from the following table:

| Signal:         | R | G | B | B-G | B-R | CK |
|-----------------|---|---|---|-----|-----|----|
| Blue response:  | 0 | 0 | 1 | 1   | 1   | 1  |
| Magenta response: | 1 | 0 | 1 | 1 | 0   | 0  |
| Cyan response:  | 0 | 1 | 1 | 0   | 1   | 0  |

The disadvantage of the method is that a continuous hue control is not directly possible.

OBJECTS OF THE INVENTION

An object of the present invention is to provide an improved color discriminator which may be employed to enhance the ability of a television chroma keyer to distinctly respond to different colors.

A further object of the invention is to provide an improved color discriminator which overcomes the defects of the above prior art systems to obtain superior color selectivity combined with continuous hue control.

Other objects and advantages of this invention will be apparent from a reading of the following specification and claims taken with the drawing.

DETAILED DESCRIPTION OF PREFERRED EMBODIMENTS OF THE INVENTION

Figure 1:
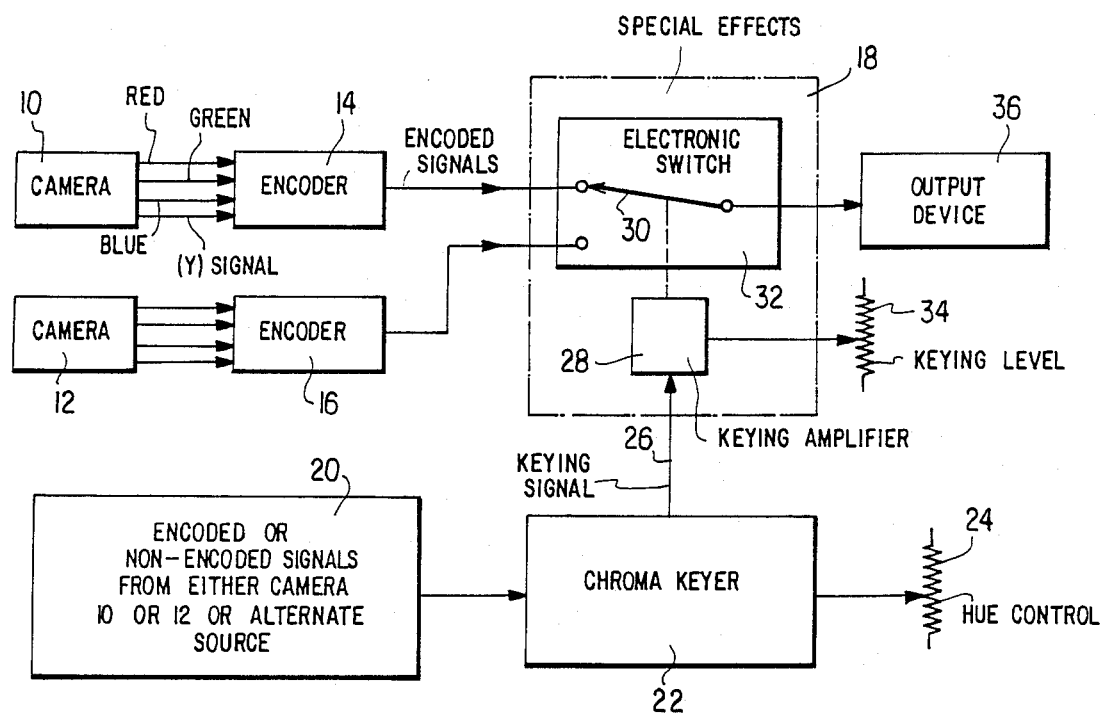
FIG. 1 is a block diagram of an illustrative embodiment of an improved chroma keyer in accordance with the invention.

Reference should be made to the drawing where like reference numerals refer to like parts.

Referring to FIG. 1 there is shown an overall system in which the present invention is employed. Typically, two cameras 10 and 12 respectively apply non-encoded red (R), green (G), blue (B), and luminance (Y) signals to encoders 14 and 16. The special effects amplifier 18 selects either camera 10 or 12 depending on the presence of a particular color of interest from a source 20. As indicated in FIG. 1, source 20 may be either camera 10 or camera 12 or some alternate source not shown and may provide either non-encoded signals R, G, and B or encoded signals. The non-encoded signals from source 20 are applied to chroma keyer 22. The "band pass" of keyer 22 may be continuously shifted in accordance with the setting of a diagrammatically indicated hue control means such as potentiometer 24, which may be remotely located from the keyer 22 at the operator's console, for example. Thus, if keyer 22 is set by potentiometer 24 to be responsive to the color green, a keying signal will be developed on line 26, the amplitude of which is a function of the amount of green in the signal produced by source 20. A keying amplifier 28 is responsive to the signal on line 26 to control the position of the armature 30 of switch 32, which is preferably electronic in nature. Typically, when the amplitude of the keying signal on line 26 is less than a threshold value established by keying level potentiometer 34, the position of the armature 30 is as shown in FIG. 1 to thereby connect camera 10 to an appropriate output device 36. However, when the amplitude of the keying signal exceeds the threshold value, the armature position is switched to connect camera 12 to the output device. Thus, a special effects signal is created at device 36, the nature of the special effect being determined in accordance with the presence of a particular color of interest at source 20. As stated above, the particular color is determined by remote control source 24.

Figure 2:
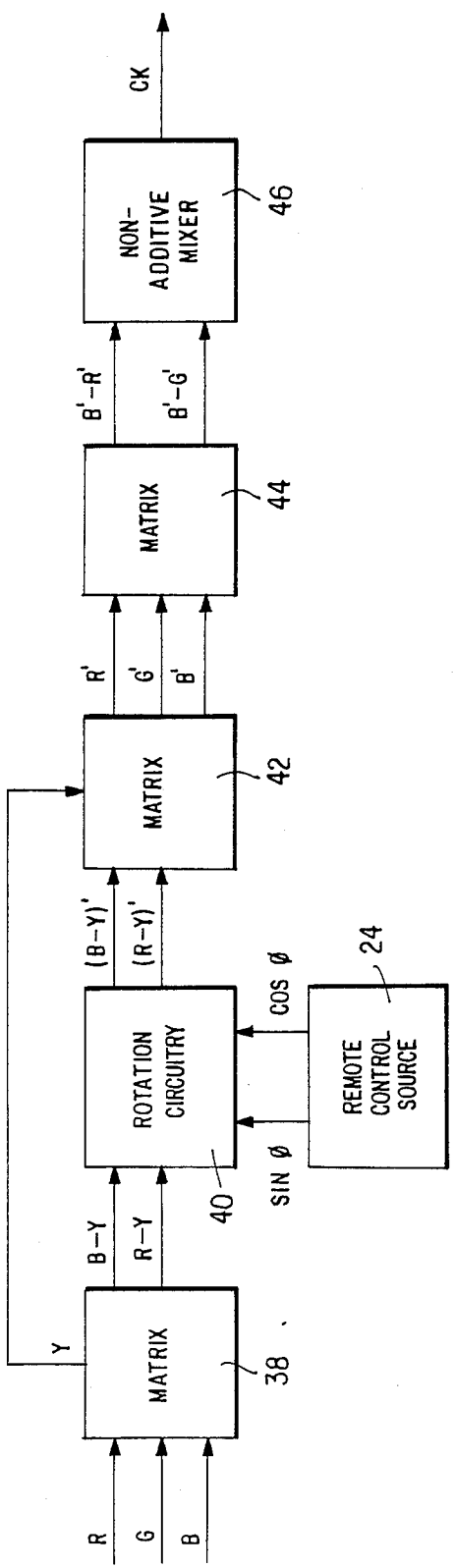
FIG. 2 is a block diagram of an illustrative embodiment of a color discriminator in accordance with the invention.

Referring now to FIG. 2, there is illustrated a block diagram of a color discriminator which may be employed in the chroma keyer 22. The discriminator may include a matrix circuit 38 which would be responsive to non-encoded R, G and B signals generated by source 20. The matrix generates orthogonal color difference signals B-Y and R-Y and luminance signal Y in a well known manner, such matrices being conventionally employed in television transmitting systems. The color difference signals are applied to rotation circuitry 40 where they are rotated in accordance with the well known geometric formula for rotating an orthogonal co-ordinate system around its origin:

$$V' = V \cos \phi + W \sin \phi \qquad (1)$$
$$W' = W \cos \phi - V \sin \phi$$

where $\phi$ is the desired rotation angle and, in accordance with the invention, corresponds to the desired or predetermined color employed for the chroma keying signal. Sin $\phi$ and cos $\phi$ control signals are generated by remote control source 24 and also applied to rotation circuitry 40. Accordingly, rotation circuitry produces new color difference signals of the form:

$$(B - Y)' = (B - Y) \cos \phi + (R - Y) \sin \phi \qquad (2)$$
$$(R - Y)' = (R - Y) \cos \phi - (B - Y) \sin \phi$$

The new color difference signals are next applied to a matrix 42 together with luminance signal Y which develops the following rotated signals R', G' and B' where $$\begin{aligned} R' &= (R - Y)' + Y \\ G' &= 1/0.59 \; [Y - 0.30((R - Y)' + Y) - \\ & \quad 0.11((B - Y)' + Y)] \\ B' &= (B - Y)' + Y \end{aligned} \qquad (3)$$

and where matrix 42 is the type conventionally employed as a decoding matrix in television receivers. Thus, the rotation circuitry 40 together with matrix 42 effectively shifts the "band pass" of the color discriminator to the predetermined color determined by the angle $\phi$.

A matrix 44 is responsive to the R', G' and B' signals to form rotated color difference signals B'-R' and B'-G'. The implementation of circuitry for effecting the functions of matrices 42 and 44 are well within the scope of skill of the workers in this art. These signals are in turn applied to non-additive mixer 46, which selects the lower of the two signals applied thereto to produce the chroma keying signal CK. Changing $\phi$ from 0° to 360° produces a maximum CK throughout the entire color spectrum.

The chroma keyer may include further circuitry in addition to the color discriminator circuitry of FIG. 2. For example, a clipping circuit (not shown) is preferably employed to clip negative excursions of the CK signal. Moreover, the CK signal is preferably delayed before being applied to keying amplifier 28 so that the keying signal and the output of encoder 16 arrive in time coincidence at special effects amplifier 18.

Figure 3:
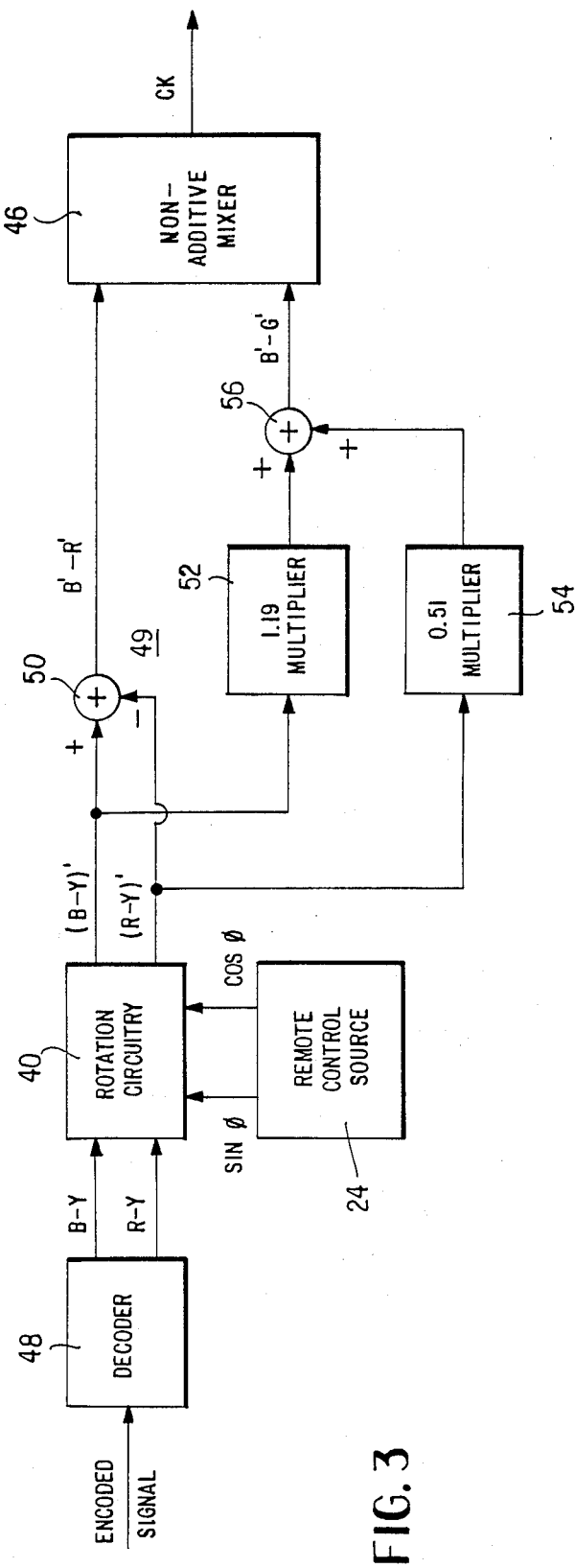
FIG. 3 is a block diagram of an illustrative, modified embodiment of a color discriminator in accordance with the invention.

Referring now to FIG. 3, there is illustrated a modified, illustrative color discriminator. In particular, the color discriminator of FIG. 3 effects the same function as that of the FIG. 2 embodiment but is considerably simplified with respect to this embodiment. Before discussing the feature whereby the discriminator circuitry is simplified, it should be noted the FIG. 3 discriminator is responsive to a composite signal encoded with the B-Y and R-Y signals. These signals may be decoded from the encoded signal in a well known manner by a decoder 48 to provide the B-Y and R-Y signals shown in FIG. 3. Thus, the color discriminators of FIGS. 2 and 3 may be responsive to either non-encoded signals as shown in FIG. 2 or encoded signals as shown in FIG. 3.

The color difference signals B-Y and R-Y are applied to rotation circuitry 40 as in the FIG. 2 embodiment to develop the new difference signals (B-Y)' and (R-Y)'. By use of a special matrix 49, the rotated color difference signals B'-R' and B'-G' can be directly derived from the (B-Y)' and (R-Y)' signals as shown below:

$$\begin{aligned} B' - R' &= [(B - Y)' + Y] - [(R - Y)' + Y] \qquad (4)\\ &= (B - Y)' - (R - Y)' \\ B' - G' &= [(B - Y)' + Y] - \\ & \quad 1/0.59 \; [Y - 0.30((R - Y)' + Y) - \\ & \quad 0.11((B - Y)' + Y)] \\ &= 1.19 \, (B - Y)' + 0.51 \, (R - Y)' \end{aligned}$$

using the formula $Y = 0.59 \, G + 0.30 \, R + 0.11 \, B$

Thus, the B'-R' signal is directly derived at adder 50 by subtracting (R-Y)' from (B-Y)' while B'-G' is directly derived by summing at adder 56 the product of 1.19 and (B-Y)' obtained at multiplier 52 and the product of 0.51 and (R-Y)' obtained at multiplier 54. The B'-R' and B'-G' signals are then applied to non-additive mixer 46 as in the FIG. 2 embodiment to obtain the chroma keying signal CK.

Figure 4:
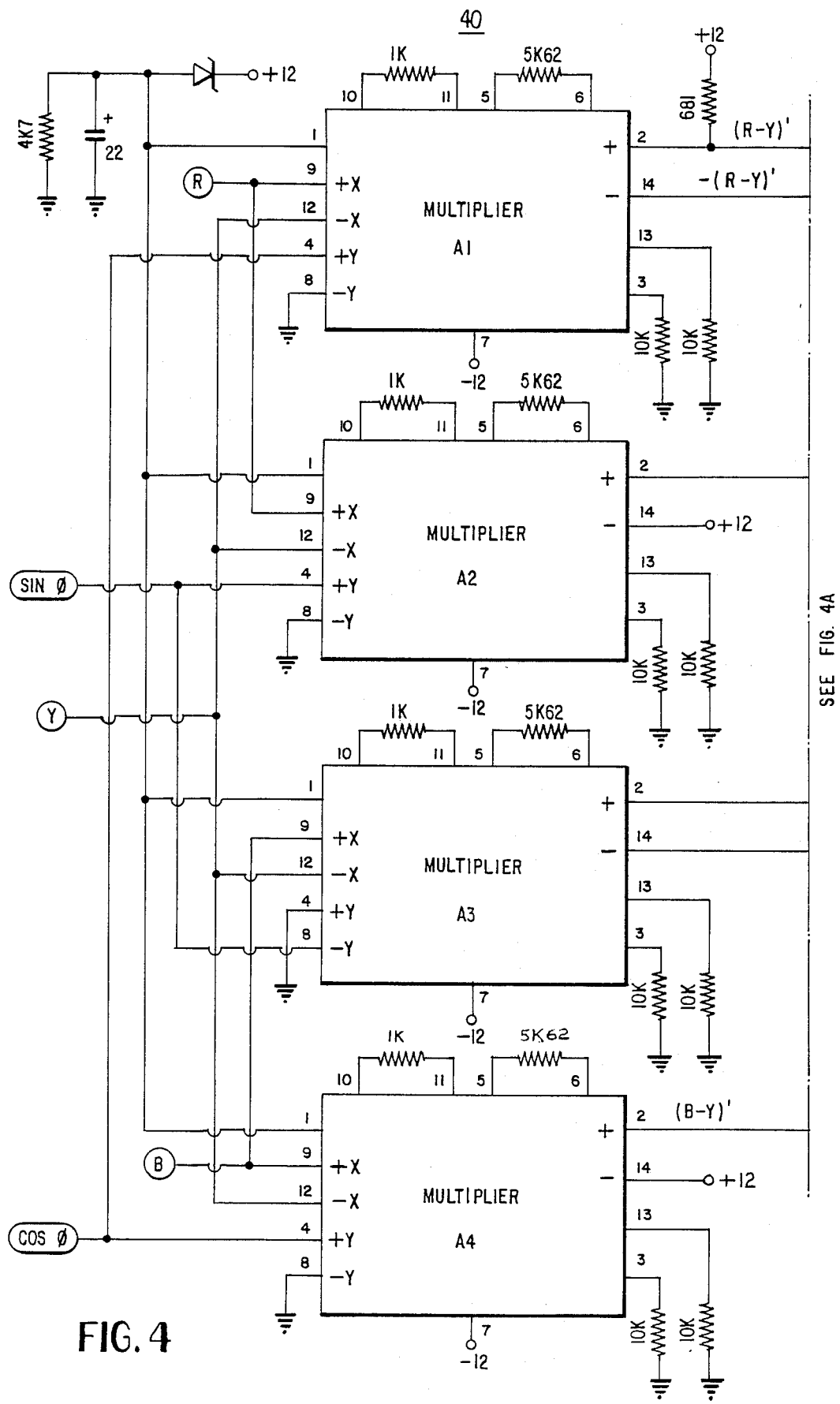
FIGS. 4 and 4A are a schematic diagram of the color discriminator of FIG. 3.
Figure 4A:
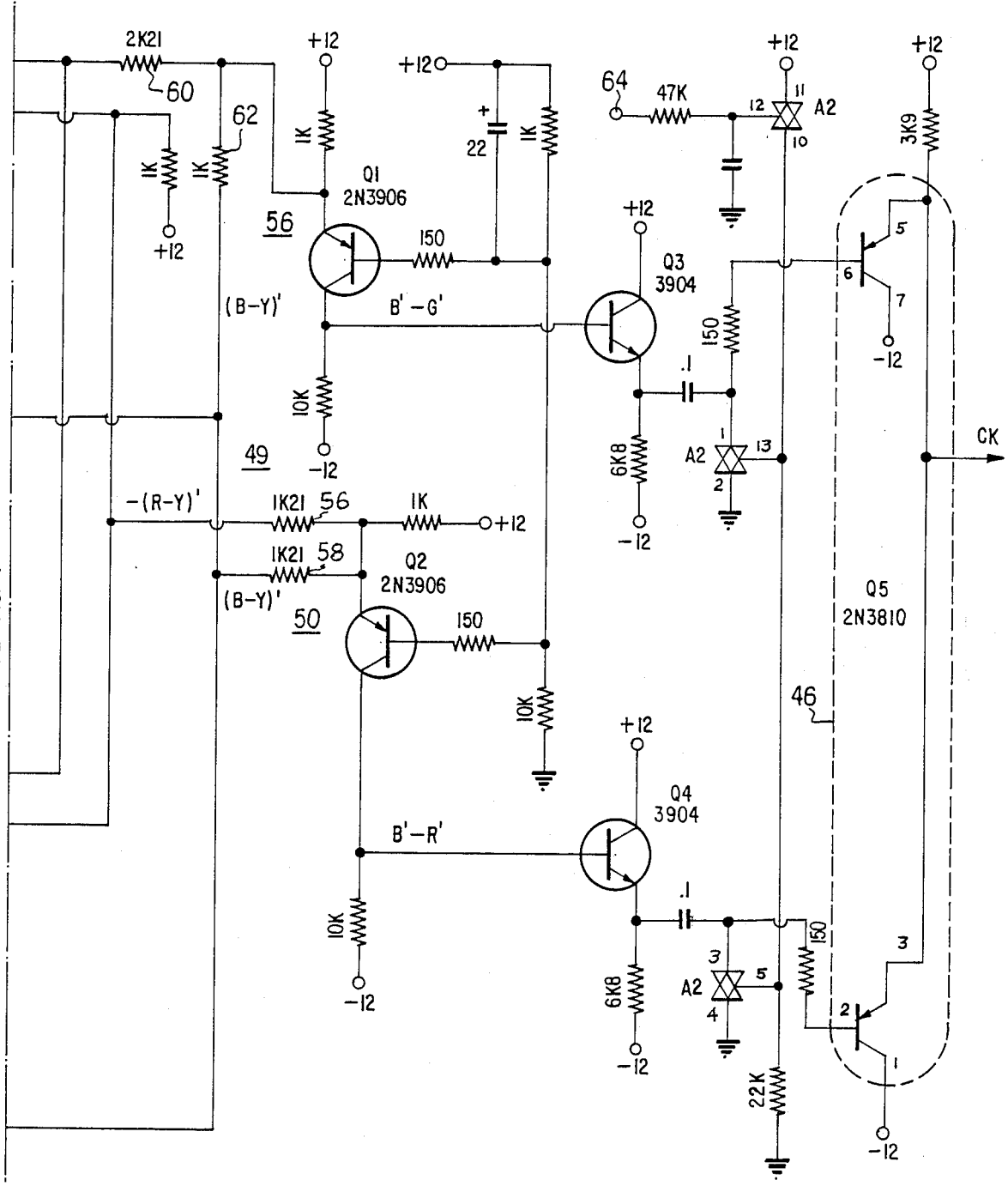

Reference should now be made to FIG. 4 which is an illustrative schematic diagram of rotation circuitry 40, matrix 49, and non-additive mixer 46 of FIG. 3. Illustrative, but not limitative values, are given for the components of the circuit diagram, the resistor values being in ohms and capacitor values being in microfarads unless otherwise specified. Rotation circuitry 40 includes linear analogue multipliers A1, A2, A3 and A4, where each may be Motorola MC1595 multipliers, the terminal locations thereof being numbered in FIG. 4. These multipliers are particularly advantageous because both the inputs and outputs thereof are differential, thus simplifying the matrixing. The R and B signals are applied to one set of X inputs and the luminance Y signal to the other so that the multipliers themselves generate R-Y and B-Y signals. The other set of inputs, Y, is connected to the sin $\phi$ and cos $\phi$ control signals.

As differential outputs are available - that is, both polarities of (R-Y)' and (B-Y)', resistive matrix 49 can directly generate the B'-G' and B'-R' signals. In particular, a first resistive matrix including resistors 56 and 58 can be employed in the subtraction of (R-Y)' from (B-Y)' to obtain the B'-R' signal which is amplified by Q2. Moreover, a second resistive matrix including resistors 60 and 62 can be employed in the formation of B'-G' which is amplified by Q1.

Q3 and Q4 are buffer emitter followers and A2 is a clamp circuit which clamps the B'-R' and B'-G' signals. These signals are then applied to non-additive mixer Q5 which consists of two PNP transistors with the emitters tied together. As is known, the signal at the emitters will always be the lowest of the two input signals whereby the chroma keying signal CK is generated. The purpose of the A2 clamping circuit, which has applied thereto at terminal 64 the blanking signal which occurs every horizontal interval, is to clamp the two signals to ground to thereby facilitate the operation of the non-additive mixer.

Figure 5:
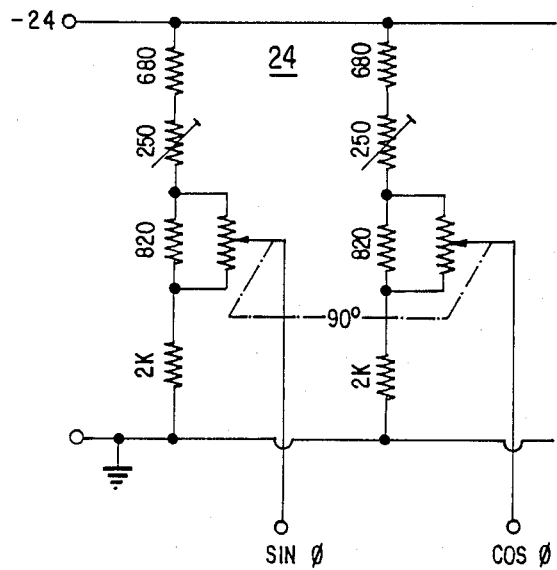
FIG. 5 is a schematic diagram of the remote control source of FIGS. 2 and 3.

Reference should now be made to FIG. 5 which is a schematic diagram of one possible embodiment of the remote control source 24. As can be seen, the elements of FIG. 5 comprise a ganged sine/cosine potentiometer, the details of which are well-known to those of ordinary skill in this art. As stated hereinbefore, an electronic sin/cos generating circuit driven by a normal linear potentiometer may alternatively be employed.

As can be appreciated from the embodiment of FIG. 2, the color discriminator of the present invention is generally responsive to the R, G, and B signals whereby they are first rotated to form the rotated signals R′, G′ and B′ and thereby effect continuous hue control. The B′-R′ and B′-G′ signals are then formed to thereby obtain enhanced selectivity. Accordingly, the present invention overcomes the defects of the prior art to obtain superior color selectivity combined with continuous hue control.

As stated above, the color discriminator is generally responsive to the R, G and B signals. It is preferably responsive to color difference signals such as the B-Y and R-Y signals illustrated in FIGS. 2 and 3. Of course, these signals are composed of the R, G and B signals. Hence, generally speaking, the discriminator is responsive to the latter signals even though color difference signals may be applied thereto. Generally, color difference signals V and W may be represented as follows:

$$V = AR + BG + CB \quad (5)$$
$$W = DR + EG + FB$$

where A, B, C, D, E, and F are constant co-efficients, the values of which are greater than or equal to $-1$ and less than or equal to 1, and R, G and B are the colors red, green and blue. If the B-Y and R-Y signals of Figures 2 and 3 respectively correspond to V and W, the co-efficients will be, as is well known, $A=-0.3$, $B=-0.59$, $C=0.89$, $D=0.7$, $E=-0.59$, and $F=-0.11$. A color difference signal will be zero when the R, G, and B components are equal and such is the case for the color difference signals employed in the present invention. Hence, any color difference signals may be employed in the present invention as long as they are zero when the R, G and B signals are equal. Illustrative of such possible color difference signals are the I and Q signals employed in color television transmission.

Moreover, the pairs of color difference signals of the present invention are preferably orthogonal. For example, the B-Y and R-Y signals are orthogonal with respect to each other. When such orthogonality exists, the above rotation formulas (1) may be employed whereby the resulting circuitry is substantially simplified. However, the pairs of color difference signals need not necessarily be orthogonal to practice the present invention. If non-orthogonal signals are employed, a computer may be necessary to effect the desired rotation of the signals. In this regard, it is to be understood a digital computer implementation of the entire chroma keyer or the discriminator thereof is also comprehended by the present invention.

Referring to the B′-R′ and B′-G′ signals of FIGS. 2 and 3, it should also be understood that other difference signal combinations may also be employed such as (a) R′-B′ and R′-G′ or (b) G′-B′ and G′-R′. The combination of B′-R′ and B′-G′ has been employed in the preferred embodiments of FIGS. 2 and 3 since the matrixing circuitry needed to derive this combination is particularly simple.

It is to be understood that the above detailed description of the various embodiments of the invention is provided by way of example only. Various details of design and construction may be modified without departing from the true spirit and scope of the invention as set forth in the appended claims.

I claim:

1. A color discriminator for selecting a signal corresponding to a predetermined color of at least a portion of the color spectrum where each color of the spectrum may be represented by red (R), green (G), and blue (B) signals, said discriminator comprising control means for generating at least one control signal which is a function of an angle $\phi$ corresponding to said predetermined color;

signal processing means responsive to said R, G and B signals and said control signal for forming (1) a first rotated color difference signal which is the difference between (a) a first one of rotated signals R′, G′, and B′ where the rotated signals R′, G′ and B′ respectively correspond to said R, G, and B signals rotated through said angle $\phi$ and (b) a second one of the remaining R′, G′ and B′ signals and (2) a second rotated difference signal which is the difference between said first one of the rotated signals and the other one of said remaining signals; and selecting means for selecting the lesser in magnitude of the first and second rotated color difference signals to thereby select the signal corresponding to said predetermined color.

2. A discriminator as in claim 1 where each color of the color spectrum is represented by at least a pair of color difference signals where each of said color difference signals is a function of at least two of said R, G, and B signals and where said signal processing means is responsive to said pair of color difference signals and said control signals to form said first and second rotated color difference signals.

3. A discriminator as in claim 2 where said pair of color difference signals are orthogonal with respect to each other.

4. A discriminator as in claim 3 where the first of said pair of color difference signals is B-Y and the second of said pair is R-Y where $Y=0.59G+0.30R+0.11B$.

5. A discriminator as in claim 2 including a source of said R, G and B signals and matrix means for developing said pair of color difference signals from said R, G, and B signals.

6. A discriminator as in claim 5 where said source is a television camera.

7. A discriminator as in claim 2 where said pair of color difference signals are encoded on a composite television signal and said discriminator includes means for decoding the color difference signals from the composite signal.

8. A discriminator as in claim 2 where said signal processing means includes signal rotating means for rotating each of said pair of color difference signals through said angle $\phi$; and means responsive to the rotated pair of color difference signals for forming said first and second rotated color difference signals.

9. A discriminator as in claim 8 where said signal rotating means includes linear analogue multipliers each having differential inputs and outputs.

10. A discriminator as in claim 1 where said signal processing means includes signal rotating means responsive to said R, G and B signals and said control signal for rotating said R, G and B signals through said angle $\phi$ to form said R', G' and B; signals; and means responsive to said R', G', and B' signals for forming said first and second rotated color difference signals.

11. A discriminator as in claim 1 where said first and second rotated color difference signals respectively are B'-R' and B'-G'.

12. A discriminator as in claim 1 where said control means includes means for generating sin $\phi$ and cos $\phi$ control signals.

13. A color discriminator for selecting a signal corresponding to a predetermined color of at least a portion of the color spectrum where each color of the spectrum may be represented by a pair of orthogonal color difference signals B-Y and R-Y where B and R are signals respectively corresponding to the blue and red components of said color spectrum, $Y=0.59G+0.30R+0.11B$, and G is a signal corresponding to the green component of the color spectrum, said discriminator comprising control means for generating sin $\phi$ and cos $\phi$ control signals where $\phi$ corresponds to the predetermined color;

signal processing means responsive to said pair of color difference signals and said sin $\phi$ and cos $\phi$ control signals for producing first and second signals having the respective magnitudes (B-Y)'−(R-Y)' and 1.19(B-Y)'+0.51(R-Y)' where (B-Y)'=(B-Y) cos $\phi$+(R-Y) sin $\phi$ and (R-Y)'=(R-Y) cos $\phi$−(B-Y) sin $\phi$; and selecting means for selecting the lesser in magnitude of the first and second signals to thereby select the signal corresponding to said predetermined color.

14. A discriminator as in claim 13 including a source of said R, G and B signals and matrix means for developing said B-Y and R-Y color difference signals from said R, G, and B signal.

15. A discriminator as in claim 14 where said source is a television camera.

16. A discriminator as in claim 13 where said pair of color difference signals are encoded on a composite television signal and said discriminator includes means for decoding the color difference signals from the composite signal.

17. A discriminator as in claim 13 where said signal processing means includes signal rotating means responsive to said B-Y and R-Y signals and said sin $\phi$ and cos $\phi$ control signals for forming said (B-Y)' and (R-Y)' signals and matrix means responsive to said (B-Y)' and (R-Y)' signals for forming said first and second signals.

18. A discriminator as in claim 17 where said further matrix means includes means for subtracting (R-Y)' from (B-Y)' to form said first signal and means for adding 1.19 (B-Y)' to 0.51(R-Y)' to form said second signal.

19. A discriminator as in claim 4 where said signal processing means includes first matrix means for forming B'=[(B-Y)+Y], R'=[(R-Y)'+Y], and G'=1/0.59[Y-0.30((R-Y)'+Y)] and second signal processing means for forming B'-R' to thereby respectively produce said first rotated color difference signal and B'-G' to thereby produce said second rotated color difference signal.

20. A discriminator as in claim 17 where said signal rotating means includes linear analogue multipliers each having differential inputs and outputs.

21. A discriminator as in claim 13 where said selecting means includes a non-additive mixer.

22. A discriminator as in claim 13 where said control means is remotely located from said signal processing means.

23. A discriminator as in claim 13 where said control means includes a ganged sine/cosine potentiometer.

24. A chroma keying system for providing a special effects signal in accordance with the presence of a predetermined color in at least a portion of the color spectrum where each color may be represented by red (R), green (G), and blue (B) signals, said chroma keying system comprising:

at least two color video signal sources;

a multiposition switch having at least two stable positions respectively corresponding to said video sources;

output means responsive to said switch, said switch connecting one or the other of said two video signal sources to said output device depending on the position of said switch to thereby create at said output device special effects;

keying means for controlling the position of said switch, said keying means, having a threshold level associated therewith, and being responsive to a keying signal applied thereto which corresponds to said predetermined color and which causes said switch to change from one of its stable positions to the other whenever the keying signal crosses the threshold level; and color discriminator means responsive to said source of non-encoded color signals for generating said keying signal, said discriminator means including control means for generating at least one control signal which is a function of an angle $\phi$ corresponding to said predetermined color;

signal processing means responsive to said R, G and B signals and said control signal for forming (1) a first rotated color difference signal which is the difference between (a) a first one of rotated signals R', G', and B' where the rotated signals R', G' and B' respectively correspond to said R, G, and B signals rotated through said angle $\phi$ and (b) a second one of the remaining R', G' and B' signals and (2) a second rotated difference signal which is the difference between said first one of the rotated signals and the other one of said remaining signals; and selecting means for selecting the lesser in magnitude of the first and second rotated color difference signals to thereby generate said keying signal.

25. A chroma keying system as in claim 24 where each color of the color spectrum is represented by at least a pair of color difference signals where each of said color difference signals is a function of at least two of said R, G, and B signals and where said signal processing means is responsive to said pair of color difference signals and said control signals to form said first and second rotated color difference signals.

26. A chroma keying system as in claim 25 where said pair of color difference signals are orthogonal with respect to each other.

27. A chroma keying system as in claim 25 where the first of said pair of color difference signals is B-Y and the second of said pair is R-Y where $Y=0.59G+0.30R+0.11B$.

28. A chroma keying system as in claim 25 including a source of said R, G and B signals and matrix means for developing said pair of color difference signals from said R, G, and B signals.

29. A chroma keying system as in claim 28 where said source is a television camera.

30. A chroma keying system as in claim 25 where said pair of color difference signals are encoded on a composite television signal and said chroma keying system includes means for decoding the color difference signals from the composite signal.

31. A chroma keying system as in claim 25 where said signal processing means includes signal rotating means for rotating each of said pair of color difference signals through said angle $\phi$; and means responsive to the rotated pair of color difference signals for forming said first and second rotated color difference signals.

32. A chroma keying system as in claim 24 where said first and second rotated color difference signals respectively are B'-R' and B'-G'.

33. A chroma keying system for providing a special effects signal in accordance with the presence of a predetermined color in at least a portion of the color spectrum where each color may be represented by a pair of orthogonal color difference signals B-Y and R-Y where B and R are signals respectively corresponding to the blue and red components of said color spectrum, $Y=0.59G+0.30R\ 0.11B$ and G is a signal corresponding to the green component of the color spectrum, said chroma keying system comprising at least two color video signal sources;

a multiposition switch having at least two stable positions respectively corresponding to said video sources;

output means responsive to said switch, said switch connecting one or the other of said two video signal sources to said output device depending on the position of said switch to thereby create at said output device special effects;

keying means for controlling the position of said switch, said keying means, having a threshold level associated therewith, and being responsive to a keying signal applied thereto which corresponds to said predetermined color and which causes said switch to change from one of its stable positions to the other whenever the keying signal crosses the threshold level; and color discriminator means responsive to said source of non-encoded color signals for generating said keying signal, said discriminator means including control means for generating sin $\phi$ and cos $\phi$ control signals where $\phi$ corresponds to the predetermined color;

signal processing means responsive to said pair of color difference signals and said sin $\phi$ and cos $\phi$ control signals for producing first and second signals having the respective magnitudes (B-Y)'-(R-Y)' and 1.19(B-Y)'+0.51(R-Y)' where (B-Y)'=(B-Y) cos $\phi$+(R-Y) sin $\phi$ and (R-Y)'=(R-Y) cos $\phi$-(B-Y) sin $\phi$; and selecting means for selecting the lesser in magnitude of the first and second signals to thereby generate said keying signal.

34. A chroma keying system as in claim 33 including a source of said R, G and B signals and matrix means for developing said B-Y and R-Y color difference signals from said R, G, and B signals.

35. A chroma keyer system as in claim 34 where said source is a television camera.

36. A chroma keying system as in claim 33 where said pair of color difference signals are encoded on a composite television signal and said discriminator includes means for decoding the color difference signals from the composite signal.

37. A chroma keying system as in claim 33 where said signal processing means includes signal rotating means responsive to said B-Y and R-Y signals and said sin $\phi$ and cos $\phi$ control signals for forming said (B-Y)' and (R-Y)' signals and matrix means responsive to said (B-Y)' and (R-Y)' signals for forming said first and second difference signals.

38. A chroma keying system as in claim 33 where said control means is remotely located from said signal processing means.

* * * * *